Figure 1:
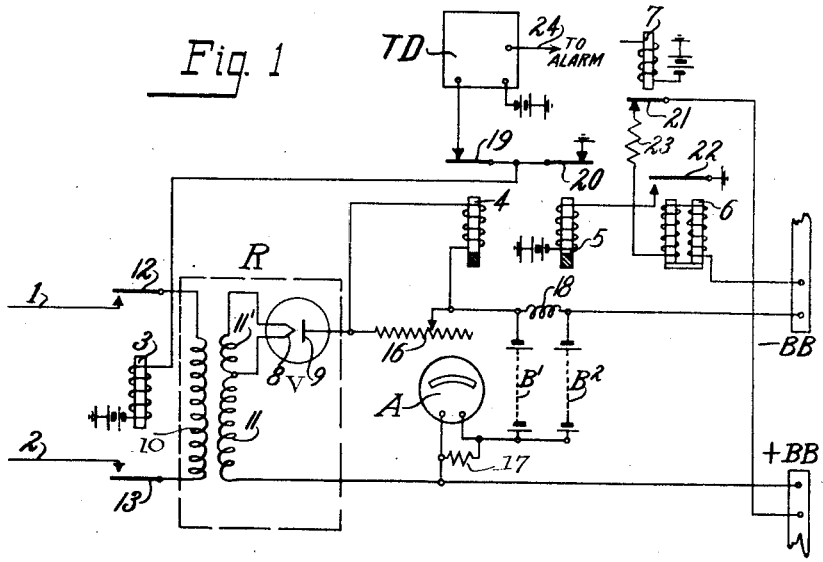

Sept. 10, 1929.    M. SCHWARTZ    1,727,381
BATTERY CHARGING SYSTEM
Filed July 10, 1926

Inventor
Michael Schwartz
Wm Walter Owen Atty.

Patented Sept. 10, 1929.

1,727,381

UNITED STATES PATENT OFFICE.

MICHAEL SCHWARTZ, OF CHICAGO, ILLINOIS, ASSIGNOR TO AUTOMATIC ELECTRIC INC., OF CHICAGO, ILLINOIS, A CORPORATION OF DELAWARE.

BATTERY-CHARGING SYSTEM.

Application filed July 10, 1926. Serial No. 121,525.

This invention relates in general to battery charging equipment, but more particularly to the equipment for charging the battery of a small telephone exchange; and the principal object, briefly stated, is the production of a new and improved battery charging system for charging the storage batteries of an exchange from an alternating current source, wherein the rectifier is used efficiently, and in which battery noises produced by the charger are prevented from reaching the exchange bus bars.

Modern automatic telephone systems can be economically operated in small units, located in congested districts. For the most part these exchanges are unattended, that is no maintenance man is stationed at the exchange, but rather one man maintains several of such exchanges, visiting each periodically. In districts where such an exchange is located, commercial power, usually 115 volt alternating current, is available, and is for the most part reliable. Since the amount of switching equipment in such an exchange is small, the battery and voltage regulating equipment must be inexpensive but at the same time must be of high quality and very reliable if the exchange is to work satisfactorily in conjunction with the other exchanges of the system.

Heretofore batteries for such an exchange have been floated across a motor generator set, being constantly charged at a low rate. While an arrangement of this kind gave quite satisfactory service, the motor generator set required frequent supervision to lubricate it and clean its commutator, with the result that the maintenance man was required to visit the exchange more frequently than the automatic switches required. There are available several thermionic rectifiers, in which alternating current is converted into direct current to charge the battery by means of a thermionic valve consisting of a heated cathode and a suitable anode incased in an area of inert gas. Most of the rectifiers of this kind are half wave rectifiers, that is they permit the flow of current from cathode to anode in one direction and prevent its flowing in the opposite direction. The use of such a rectifier on the battery of a telephone exchange produces an undesirable hum in the battery, that hum being caused by the impulses of current which the rectifier delivers to the battery. It is possible by suitable chokes and filters to smooth out the rectified current to such an extent that the hum is reduced, but the use of such a filtering system impairs the efficiency of the rectifier very seriously and makes it necessary to install a very large rectifier for a small battery.

In accordance with one of the objects of this invention I provide a new and improved charging system in which a half wave thermionic rectifier is used to charge the battery of an exchange, and in which the noise produced by the impulses of current flowing into the battery is prevented from reaching the exchange bus-bars. In accordance with this object of my invention I provide a main and an auxiliary battery, the auxiliary battery being charged directly by the rectifier and the main battery being charged by the auxiliary battery. These two batteries are connected together by means of a suitable high impedance, low resistance choke coil, which permits charging of the main battery at high efficiency.

In an exchange it may happen that traffic will be unusually light for a long period of time, during which the battery would be overcharged if special means for preventing it were not provided. It is customary to provide a high-low voltage relay for this purpose, that relay energizing when voltage of the battery reaches a certain predetermined high limit, to control circuits through which the charge is stopped. The relay deenergizes when the battery reaches a certain predetermined low voltage limit, and upon deenergizing starts the charge again. Considerable trouble has been experienced with the low voltage control of such a system, the trouble being caused by the erratic releasing of the low voltage relay which frequently remained energized until the battery was discharged to such an extent that the terminal voltage was too low to properly operate the exchange. Accordingly, as a further object of my invention I provide a new and improved voltage regulating device, comprising a high voltage relay arranged to control both the starting and stopping the charging of the battery, that relay being energized to stop the charge when the voltage of that battery reaches a predetermined high limit. However, instead of depending on the rather uncertain low voltage release of a relay, I open the circuit of the high voltage relay at the end of each call through the office, that relay falling back to retest the voltage and start the charge so that the battery is immediately charged up to the maximum voltage.

As a further object of my invention I provide a booster battery arranged to be connected in series with the main and auxiliary batteries and the exchange bus-bar, that booster battery being switched into the circuit after a predetermined time if the rectifier or the commercial current fails to function properly.

Further objects of my invention not specifically mentioned here will be apparent from the detailed specification and claims which follow.

Figure 2:
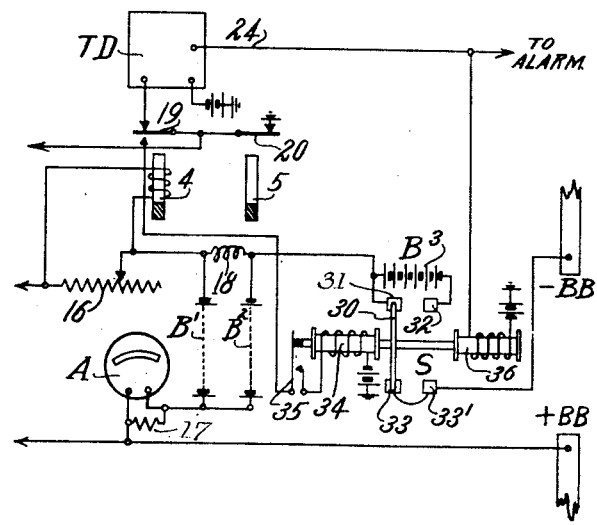

The drawings comprising Figs. 1 and 2 show sufficient of the details of my invention to enable a clear understanding of its operation; Fig. 1 being a preferred embodiment of the invention while Fig. 2 is a modification.

In Fig. 1, I show a rectifying device R; main and auxiliary batteries $B^1$ and $B^2$, respectively, bus-bars minus BB and plus BB; high voltage relay 6 and control relays 4, 5, and 7; timing device TD; charging regulator 16; ammeter A; choke 18 which connects the batteries $B^1$ and $B^2$, and relay 3 through which the rectifier R is connected to the commercial current leads 1 and 2. The rectifying device R as shown consists of a thermionic valve V comprising a cathode 8 and an anode 9 suitably incased; and a transformer comprising a primary and two secondary windings. The total number of turns in the primary winding can be varied by a primary regulating switch, and the number of turns in one secondary winding can be varied by a secondary adjusting switch (not shown), in well known manner. Such a rectifying device is a so called half wave rectifier, that is, only one half of the wave of current in the secondary winding, is delivered to the battery. With such a device, the battery is charged by a series of impulses of direct current, an arrangement which satisfactorily charges the battery. However half wave rectifiers produce a great deal of noise in a battery, that noise being sufficient to prevent their use heretofore in battery floating systems.

The batteries $B^1$ and $B^2$ have a combined capacity equal to the twenty-four hour demand of the exchange, that capacity being equally divided between the two batteries. That is, if an exchange requires a 60 ampere hour battery I would supply two 30 ampere hour batteries connected as shown in Fig. 1.

With the rectifier and batteries connected as shown in Fig. 1 all of the power delivered by the rectifier, except a small part dissipated in the regulator 16 and the relay 4, is utilized in charging the auxiliary battery $B^1$. This charging current being intermittent is to a large extent prevented from entering the main battery $B^2$ by the high impedance of the choke coil 18. When the voltage of $B^1$ has been raised above that of $B^2$ the former battery acts as a driver, driving direct current through the choke coil 18 to the main battery $B^2$ to charge that battery. The choke coil 18 is so constructed as to have a high impedance and at the same time a low resistance, so that very little power is lost when $B^1$ charges $B^2$. Since $B^2$, which is directly across the exchange bus bars, is charged with direct current from $B^1$, no charging noises are transmitted to the bus bars and the exchange is therefore quiet.

The timing device TD may be either a dash pot relay which will close the alarm circuit a few seconds after it is energized, or preferably it may be any suitable device which will close the alarm circuit after a considerably longer interval. In the system of the present invention, this interval may be an hour or more.

In Fig. 2, I show a modification of the system of Fig. 1, employing the same rectifier as in Fig. 1 which is omitted from Fig. 2 to avoid unnecessary complication thereof. In Fig. 2 I show the auxiliary battery $B^3$, the switch S which is operated by the timing device TD to connect the battery $B^3$ in series with the main and auxiliary batteries and the bus-bar. I propose to use as battery $B^3$ a plurality of primary batteries, such as Edison primary batteries which are particularly fitted for such use. These batteries are available in large ampere hour capacities, and when open circuited deteriorate at a very low rate thereby leaving practically all of their capacity available for use.

Having thus described my system in general I will now proceed with a detailed description of its operation. Referring now to Fig. 1, assuming the voltage across the bus-bars plus and minus BB is insufficient to operate the high voltage relay 6, that relay will remain in its normal position and relay 3 will be energized over a circuit traceable from ground through springs 20, through the winding of relay 3 to battery. Relay 3 upon energizing closes the circuit through the primary winding 10 of the rectifying transformer R, being traceable from the commercial main 1, through springs 12, through the winding 10, springs 13 through the commercial main 2. The alternating current flowing through the winding 10 of the transformer induces in the secondary windings 11 and 11' a definite voltage, that voltage in the winding 11' driving current through the cathode 8 of the thermionic rectifier V heating that cathode to the point of incandescence at which temperature electrons will be freely emitted. During the time that the voltage of the cathode 8 is lower than that of the anode 9, the electrons will flow freely from 8 to 9, producing a current in the external circuit connected to the valve V to produce a pulse of current therein, that circuit traversing through the regulating impedance 16, through the battery $B^1$, through the shunt 17, in parallel with the ammeter A, winding 11 of the transformer back into the winding 11' to the cathode 8. A parallel path for current includes the circuit of the relay 4, energizing that relay which disconnects the timing device TD at the springs 19, for a purpose which will be explained in detail hereinafter. The voltage across the terminals of the battery $B^1$ is raised, an amount dependent upon the setting of the regulator 16. Because of the high impedance of the choke 18, the impulse of current which is of a transient nature, is prevented from entering the battery $B^2$. Thus the battery $B^1$ receives a pulse of current in the proper direction to charge it and since the voltage across the terminals is raised slightly, it is assumed that that voltage is somewhat above that of the battery $B^2$. Battery $B^1$ will therefore act as a driver forcing current through the choke 18, battery $B^2$ and thence back into the battery $B^1$, the amount of that current depending upon the potential difference of the two batteries and upon the resistance of the circuit. As has been previously explained, the choke 18 is of high impedance, but is so constructed as to be of very low D. C. resistance, and therefore offers a minimum obstruction to the flow of current from the battery $B^1$ to battery $B^2$. The entire output of the rectifier R with the exception of the small amount utilized in energizing the relay 4 and the power lost in the voltage regulator 16, is absorbed by the battery $B^1$ to be later transferred to the battery $B^2$ to bring that battery up to the same potential as the battery $B^1$. As this charge continues the terminal voltage of the batteries $B^1$ and $B^2$ will increase, when that voltage reaches a certain definite limit relay 6 will operate over a circuit traceable from the bus-bar plus BB through the springs 21, resistance 23, windings of relay 6 to the negative bus-bar minus BB. Relay 6 upon energizing closes a circuit from springs 22, through the winding of relay 5 to battery, energizing that relay which at springs 20 opens the circuit of relay 3 permitting that relay to deenergize, and at springs 12 and 13 open the primary circuit of the transformer R, from the commercial leads 1 and 2. When the primary of the transformer is open circuited the voltage induced in the secondary winding 11' dies away, the cathode 8 of the rectifier V becomes cold, and consequently the charge is stopped. The anode 9 and the cathode 8 are left connected to the battery $B'$, since there is no danger of the battery discharging through the valve V. $B^1$ will continue to charge $B^2$ until the voltage of the two batteries is the same, at which time they jointly discharge into the bus-bar to carry the exchange load as required.

In an exchange employing switches of the well known Strowger type, a supervisory relay is usually provided in series with the release magnet of those switches, such a relay being shown in Fig. 1, indicated as relay 7. That relay energizes each time a switch releases, and closes a circuit through a slow acting alarm which operates after a definite interval to bring up a signal if the switch has not properly released meanwhile. I use relay 7 for the additional purpose of disconnecting the high voltage relay 6 from the bus-bar BB, this being accomplished by the opening of springs 21. As is well known after the charge is cut off the battery, it loses its voltage rapidly until the terminal voltage of each cell reaches a prescribed amount, that being about two volts per cell for a lead-sulphuric acid battery. A relay such as 6 when locked energized will maintain its armature in operated position even though the voltage across the terminals of its coil is materially decreased, while providing the springs 21 operated by the release supervisory relay 7, opens the circuit of relay 6 at will, permitting that relay to fall back. If when the relay 7 deenergizes and again closes springs 21 to place the relay 6 across the bus-bar, and the voltage of that bus-bar has fallen a sufficient amount to prevent the energization of relay 6, relay 5 deenergizes after a brief interval and at spring 20 recloses the circuit to relay 3 whereupon the charging process is continued. When the voltage of the batteries $B^1$ and $B^2$ again reaches the high voltage limit, relay 6 energizes as soon as relay 7 restores, and the charge is again stopped.

Assume that after the relay 6 is deenergized to open the circuit of relay 5, allowing that relay to deenergize, trouble develops either in the valve V or in the commercial circuit so that during the interval that the charge is supposed to be on the charging equipment does not function. Relay 4 will therefore not energize, and the circut from grounded spring 20 through spring 19 to the timing device TD will start the operation of that device. The timing device TD may be of any well known slow operating device arranged to close a circuit to the alarm conductor 24 after a definite interval, that interval may be a few seconds or may be an hour, as the occasion demands. If the interval of the timing device TD elapses before the trouble in rectifier R is corrected, the circuit through the alarm conductor 24 is closed, that circuit may be extended to an attended office to apprise the attendant there of the trouble in the unattended office. If however, the trouble is of such nature that it corrects itself in a few minutes, that is the power may go off the commercial leads 1 and 2 for a few minutes and then be replaced, the charge will start immediately upon the correction of the trouble, relay 4 will energize, opening the circuit for the timing device TD, permitting that device to restore to normal in the well known manner.

Referring now to the modification shown in Fig. 2 it will be seen that the output of the rectifier R is connected to the battery $B^1$ through the regulator 16 and the relay 4 as before. $B^1$ charges the battery $B^2$ through the impedance 18, the output of the batteries $B^1$ and $B^2$ being led to the negative bus-bar through contact 31, switch arm 30, contacts 33 and 33' and thence to the bus-bar. The connection from the positive side of the battery to the positive bus-bar is through the shunt 17 in parallel with the ammeter A as before. When the batteries are sufficiently charged to raise the voltage across the bus-bars to the point where the high voltage relay operates, relay 5 is energized by that relay as before to open springs 20 to stop the charge. When relay 5 is subsequently deenergized, and the charge circuit closed at spring 20, a circuit is also closed through spring 19 to the timing device TD. Assume now that the rectifier R is in trouble and that the charge is not started and the relay 4 is consequently not energized. The timing device functions as before after a definite interval, throwing a ground out over the alarm conductor 24 through the winding 36 of the switch S to grounded battery, energizing that switch to move the arm 30 from contacts 31 and 33 to contacts 32 and 33', at which time the circuit from the positive bus-bar to the negative bus-bar includes the shunt 17 and ammeter A, batteries $B^1$ and $B^2$ in parallel with the impedance 18 connected between them, battery $B^3$, contact 32, switch arm 30, contact 33' and thence to the negative bus-bar BB. In this manner the battery $B^3$ is thrown into the circuit to assist the main batteries $B^1$ and $B^2$ in carrying the exchange load. The ground placed upon conductors 24 by the timing device TD, grounds the centralized alarm as before, to inform the supervisor of the condition at the unattended exchange. Assume however that the trouble clears itself after a short while, in which case the charge will again be started and relay 4 will energize, opening the circuit of the timing device TD at springs 19, permitting that device to restore to normal and remove the ground from conductor 24. The operation of relay 4 closes a circuit from grounded spring 20, through spring 19 and its make contact, through the springs 35 which were operated when the switch S was removed to the right, through the winding of magnet 34 to grounded battery, that magnet energizing to pull the plunger carrying switch arm 30 to the left, in the position shown in the drawing. When the arm 30 is in the position in which it engages contacts 31 and 33, springs 35 are opened, thereby opening the circuit of the magnet 34 permitting that magnet to deenergize. The switch S is so constructed that the switch arm stays in the position last set independent of the energization or deenergization of the operating magnets 34 and 36. The battery $B^3$ being of the open circuit type, such as an Edison primary battery, for example, is discharged only when the switch arm 30 engages contacts 32 and 33', and when the battery is out of circuit it depreciates at a very low rate. It will be seen that by this arrangement I have provided a safety feature which is brought into play to maintain the bus-bar voltage at the proper value in the case of a serious interruption of the charging circuit. Therefore it will be seen that the arrangement shown in Fig. 2 is particularly adaptable to exchanges which are served by commercial power company whose service is more or less irregular.

While I have chosen to show my invention in connection with a particular type of apparatus I have done so merely by way of example, as there are many modifications and adaptations which will be apparent to one skilled in the art which can be made without departing from the scope of the invention.

The thermionic rectifier that I have indicated is of the half wave type, that type being the worst offender from the stand point of producing noise in a telephone battery. It will be obvious that if the system of my invention works satisfactorily with a half wave rectifier, it will also work with a full wave rectifier, the latter being more expensive, would not be justified in many installations, but would be of utility in others.

Various types of rectifiers might be used in place of the thermionic rectifier indicated, but as a rule these devices are not self starting and more care and supervision is required than with the type indicated. These and many other modifications will be apparent to one skilled in the art.

Having thus described my invention, what I consider new and desire to have protected by Letters Patent is pointed out in the appended claims.

What is claimed is:

1. A battery supply system comprising a main and an auxiliary battery, charging equipment for charging said auxiliary battery, circuit connections through which said auxiliary battery charges said main battery, a voltage determining means connected to said batteries, means controlled thereby to govern the charging of said auxiliary battery, a booster battery, and means operated a definite interval after a failure of said charging equipment to connect said booster battery in circuit with said other batteries.

2. A battery supply system comprising a main and an auxiliary battery, charging equipment for charging said auxiliary battery, circuit connections through which said auxiliary battery charges said main battery, a voltage determining means connected to said batteries, means controlled thereby to govern the charging of said auxiliary battery, a booster battery, and an electromagnetic switch operated a definite interval after a failure of said charging equipment to connect said booster battery in circuit with said other batteries.

3. A battery supply system comprising a main and an auxiliary battery, charging equipment for charging said auxiliary battery, circuit connections through which said auxiliary battery charges said main battery, a voltage determining means connected to said batteries, means controlled thereby to govern the charging of said auxiliary battery, a booster battery, and an electromagnetic switch, a timing device started when said determining means prepares for the charging of said auxiliary battery, a relay energized when said charge starts, means in said timing device for closing a circuit to said switch after a definite interval if said relay has not been energized, said switch operated thereover to connect said booster battery in circuit with said other batteries.

4. A battery supply system comprising a main, and an auxiliary battery, charging equipment for charging said auxiliary battery, circuit connections through which said auxiliary battery charges said main battery, a voltage determining means connected to said batteries, means controlled thereby to govern the charging of said auxiliary battery, a booster battery, and an electromagnetic switch operated a definite interval after a failure of said charging equipment to connect said booster battery in circuit with said other batteries, and means for restoring said switch to disconnect said booster when said charging equipment is again operated.

5. A battery supply system comprising a booster battery and a main battery, charging equipment for charging said main battery, voltage determining means connected to said main battery, means controlled thereby to govern the charging of said main battery, and an electromagnetic switch operated upon the failure of said charging equipment to connect said booster battery in circuit with said main battery and reoperated upon the reoperation of said charging equipment to disconnect said booster battery from said main battery.

6. A battery supply system comprising a main and an auxiliary battery, charging equipment for charging said auxiliary battery, means whereby said auxiliary battery charges said main battery, a voltage determining means connected to said batteries, means controlled thereby to govern the charging of said auxiliary battery, a booster battery, and means operated upon the failure or operation of said charging equipment to connect in circuit or disconnect said booster battery and said other batteries.

In witness whereof, I hereunto subscribe my name this 8th day of July, A. D. 1926.

MICHAEL SCHWARTZ.